(No Model.) 2 Sheets—Sheet 1.

W. H. MARSHALL.
SLACK ADJUSTER FOR CAR BRAKES.

No. 490,357. Patented Jan. 24, 1893.

Witnesses
Edwin L. Bradford
Wm C. Dyre

Inventor
Waldo H. Marshall
by F. W. Ritter Jr.
Attorney

THE NORRIS PETERS CO., PHOTO-LITHO., WASHINGTON, D. C.

(No Model.) 2 Sheets—Sheet 2.
W. H. MARSHALL.
SLACK ADJUSTER FOR CAR BRAKES.
No. 490,357. Patented Jan. 24, 1893.
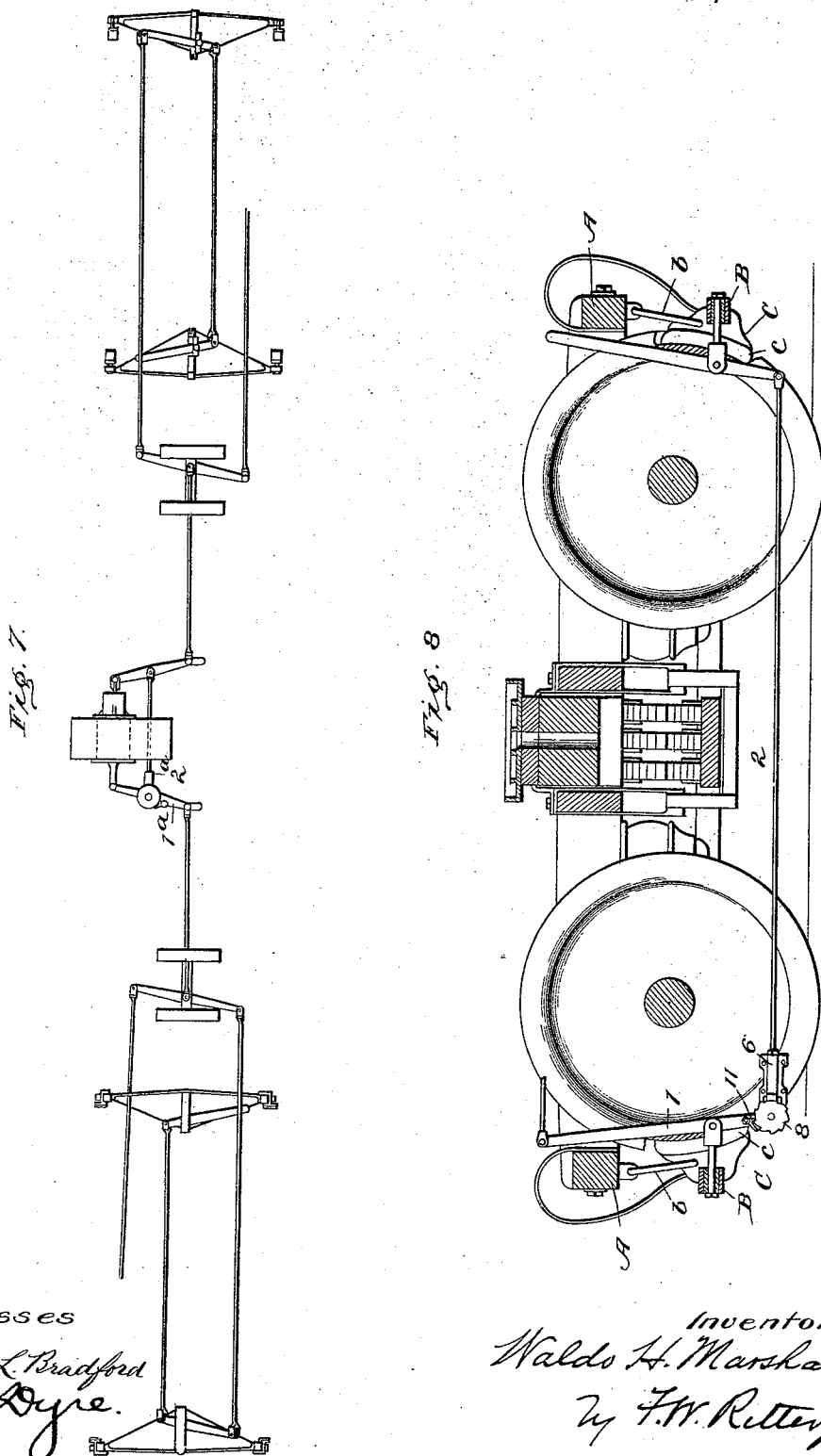
Witnesses
Edwin L. Bradford
Wm E. Dyre
Inventor
Waldo H. Marshall
by F. W. Ritter Jr
Attorney

UNITED STATES PATENT OFFICE.

WALDO H. MARSHALL, OF CHICAGO, ILLINOIS, ASSIGNOR TO THE CONSOLIDATED BRAKE ADJUSTER COMPANY, OF SAME PLACE.

SLACK-ADJUSTER FOR CAR-BRAKES.

SPECIFICATION forming part of Letters Patent No. 490,357, dated January 24, 1893.

Application filed November 5, 1892. Serial No. 451,093. (No model.)

*To all whom it may concern:*

Be it known that I, WALDO H. MARSHALL, a citizen of the United States, residing at Chicago, in the county of Cook, State of Illinois, have invented certain new and useful Improvements in Slack-Adjusters for Brakes; and I hereby declare the following to be a full, clear, and exact description of the same, reference being had to the accompanying drawings, in which—

Figure 1:
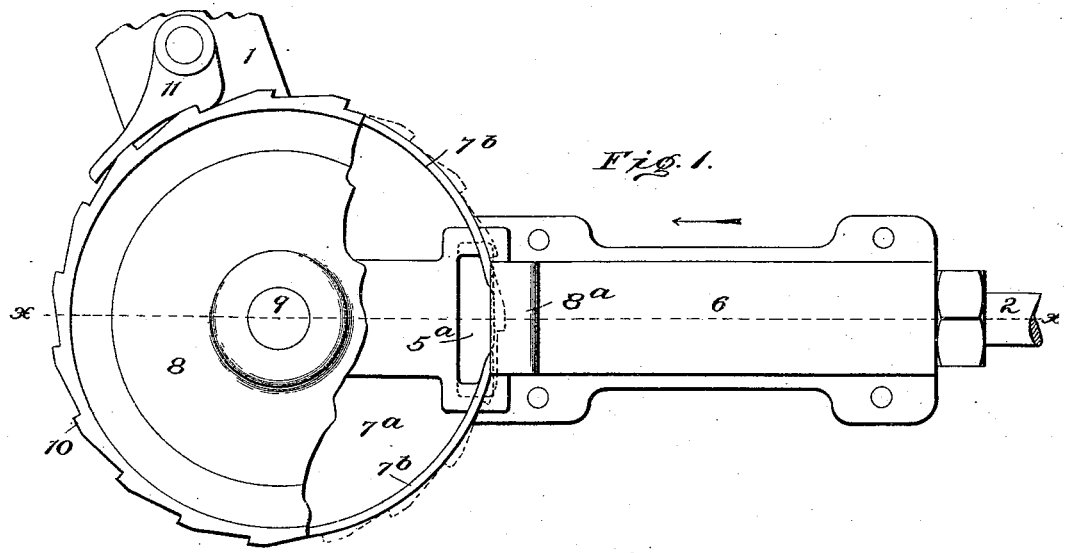
Figure 2:
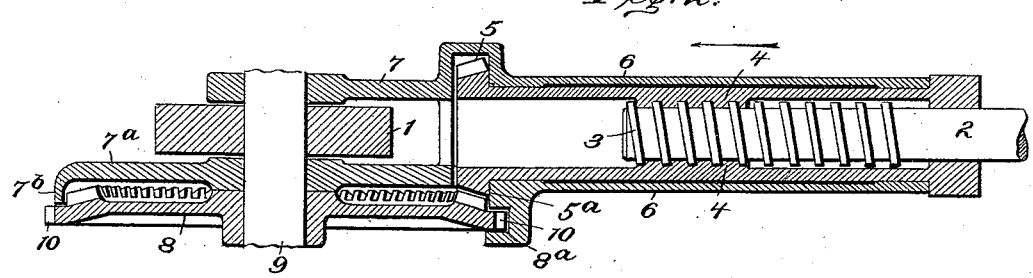
Figure 3:
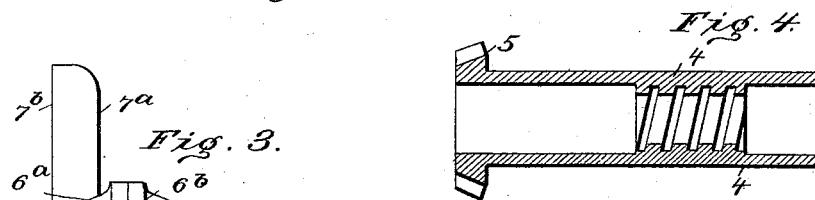
Figure 4:
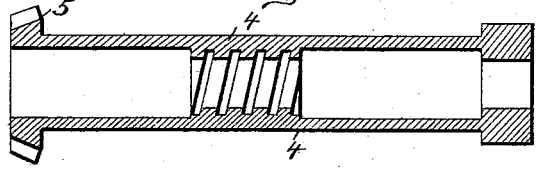
Figure 5:
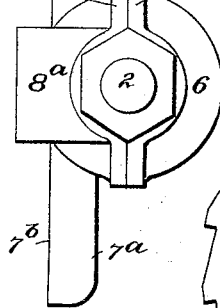
Figure 6:
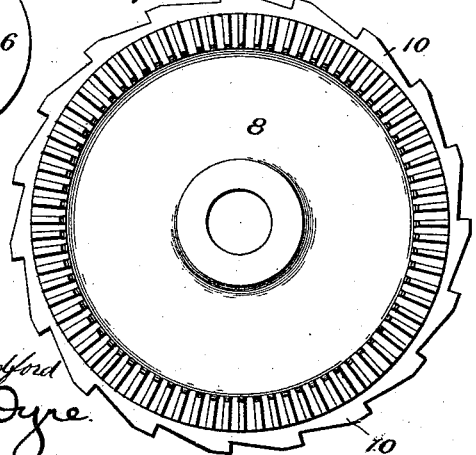

Figure 1, is a side elevation of devices embodying my invention. Fig. 2, is a longitudinal section on the line $x$—$x$ Fig. 1. Fig. 3, is an end view looking in the direction of the arrows, Figs. 1 and 2. Fig. 4, is a detached view of the sleeve nut. Fig. 5, is a detached view of the gear wheel. Fig. 6, is a detached view of lever and pawl. Fig. 7, is a view of a brake system for two trucks with intermediate cylinder showing devices embodying my invention applied to the fulcrum rod between the levers. Fig. 8, is a view showing my improved device applied to the "live" lever or lower rod of the truck system.

Like symbols refer to like parts wherever they occur.

My invention relates to that class of devices termed "slack-adjusters," used in conjunction with brake mechanism to automatically take up and readjust the connections thereof to compensate for wear of the brake shoes and like lost motion.

In the primary arrangement and adjustment of brake mechanism a certain distance is established between the face of the brake-shoe and the wheel when the brake is off, and a certain predetermined movement of the power devices is required to apply the brakes. Such movement may be termed the "normal" movement. In course of time the wear on the brake shoes, and other causes tend to constantly increase the distance between the face of the shoe and the wheel when the brake is off, and demand a greater movement or "excessive" movement of the brake mechanism or power to effectively apply the brakes, and in case of pistons and cylinders for applying the brakes—where the movement of the piston is necessarily limited—the slack thus caused becomes a serious matter.

Owing to the character of brake mechanism, the hard service to which it is subjected, and the unskilled labor in charge of it—it is very desirable that mechanism for taking up the slack above referred to should be as simple, little liable to get out of repair, and as effective as possible.

My present invention is therefore directed to the simplification of slack-adjuster mechanism, and the rendering of it positive and certain in its operation.

To this end the main feature of my invention embraces the combination with a threaded connecting rod and a nut arranged thereon, of gear mechanism for actuating the nut to take up the slack—the position of said combination in the brake mechanism being immaterial, provided it is such that the gearing shall be operated by any "excess" over the "normal" movement of the power in applying the brakes as first adjusted.

There are other minor features of invention, relating to specific combinations and details of construction, all as will hereinafter more fully appear.

I will now proceed to describe my invention more fully so that others skilled in the art to which it appertains may apply the same In the drawings, A indicates the support (truck or body, as the case may be) from which the brake beams B are suspended by hangers $b$ $b$ in the usual manner, and provided with brake heads and shoes C, $c$, and the usual or any approved lever system.

In Fig. 7, the devices embodying my invention are shown as applied to one of the two levers $1^a$ connected directly to the piston and cylinder between the trucks—the fulcrum rod $2^a$ being the threaded connecting rod—while in Fig. 8, the devices are shown as applied to the "live" lever 1 and the lower connecting rod 2, of the truck levers. The construction, operation and function of the devices however remain the same, only in the first case they may be larger, and in the second case they should be cased in order to protect them from snow, ice, dust, &c. In either case—or wherever located in the brake system—the construction will be substantially as follows:

2 indicates a connecting rod threaded at one end as at 3, and arranged thereon is a sleeve-nut 4 provided on its periphery, and preferably at one end, with a bevel pinion 5, the whole inclosed by a longitudinally partible case 6—preferably composed of sections 6ª 6ᵇ—(see Fig. 3)—which terminates in a jaw or fork 7 whereby it may be pivoted to a lever 1 (or 1ª) or other source of power within the system. The opposite or non-threaded end of the connection is to be connected with another lever or equivalent portion of the system which transmits the power to the brakes. One arm of the bifurcation or fork 7, is preferably expanded in the form of a thin plate 7ª whose edges are turned outward, or dished as at 7ᵇ to inclose the bevel gear 8 and protect the same from dirt or other obstruction. This arm of the fork is also slotted as at 5ª to permit the projection of bevel pinion 5 and its engagement with the large bevel gear 8, and said arm if desired may be provided with a recessed bracket 8ª to receive the periphery of the bevel gear 8.

8 indicates a large bevel gear journaled on the pin 9 by which the case 6 is pivotally connected with lever 1 (or 1ª) and engaging the bevel pinion 5 on the sleeve nut 4, so as to impart a rotary movement to the sleeve nut. The periphery of bevel gear 8 is provided with a series of ratchet teeth 10 with which engage a spring dog or pawl 11 pivoted on the lever 1 (or 1ª) so that any "excess" of movement (beyond the normal) of lever 1 in applying the brakes will cause the pawl or dog 11 to advance over a proportionate distance on the periphery of the gear (over a given number of teeth) 10, and the return movement of the lever will cause the corresponding rotation of bevel gear 8 and sleeve nut 4 to take up the slack in the brake system to which the devices are applied.

Having thus described my invention what I claim and desire to secure by Letters Patent is:—

1. In a slack-adjuster for brakes, the combination with a threaded rod and nut arranged thereon, of gear mechanism for actuating the nut, said gear mechanism journaled on and actuated from a moving part of the brake system; substantially as and for the purposes specified.

2. In a slack-adjuster for brakes, the combination with a threaded rod, of a sleeve nut provided with a bevel pinion, a bevel gear which meshes with the pinion on the nut, said gear journaled on and actuated by a lever of the brake system; substantially as and for the purposes specified.

3. In a slack-adjuster for brakes, the combination with a threaded rod and nut arranged thereon, of a gear wheel for actuating the nut, and a pawl for actuating the gear wheel, said gear wheel and pawl arranged on a moving part of the brake system; substantially as and for the purposes specified.

4. In a slack-adjuster, the combination with a threaded rod and a sleeve nut arranged thereon and provided with a peripheral pinion, of a bevel gear arranged to engage the peripheral pinion of the nut, and an inclosing case slotted for the peripheral pinion of the nut and dished to protect the bevel gear; substantially as and for the purposes specified.

5. In a slack-adjuster for brakes, the combination with a brake lever of the system, of a threaded rod, a nut arranged on the rod and provided with a peripheral pinion, an inclosing case for the nut said case pivoted on the lever, a bevel gear journaled on the lever and which engages the pinion on the nut, and means for actuating the bevel gear from the lever; substantially as and for the purposes specified.

6. In a slack-adjuster for brakes, the combination with a brake lever of the system, of a threaded rod, a nut arranged thereon and provided with a pinion, an inclosing case for the nut said case pivoted on the lever, a bevel gear journaled on the lever and which engages the pinion of the nut, said bevel gear having peripheral ratchet teeth, and a pawl pivoted on the lever and which engages the peripheral ratchet teeth of the bevel gear; substantially as and for the purposes specified.

In testimony whereof I affix my signature, in presence of two witnesses, this 31st day of October, 1892.

WALDO H. MARSHALL.

Witnesses:
C. F. QUINCY,
F. E. NICHOLS.